United States Patent
Boone et al.

[11] Patent Number: 5,412,978
[45] Date of Patent: May 9, 1995

[54] LEAK DETECTION SYSTEM

[75] Inventors: George R. Boone, Spring Valley; Max E. Weitz, Beavercreek, both of Ohio

[73] Assignee: Phase 1 Instruments, Inc., Dayton, Ohio

[21] Appl. No.: 81,083

[22] Filed: Jun. 22, 1993

[51] Int. Cl.⁶ .............................................. G01M 3/26
[52] U.S. Cl. ......................................... 73/49.2; 73/40
[58] Field of Search ................... 73/40, 49.2, 40.5 R

[56] References Cited

U.S. PATENT DOCUMENTS

| | | | |
|---|---|---|---|
| 3,100,986 | 8/1963 | Starr et al. | 73/40 |
| 3,331,237 | 7/1967 | Strang | 73/40 |
| 3,691,821 | 9/1972 | Davey | 73/49.2 |
| 3,813,922 | 6/1974 | Oswald et al. | 73/49.2 |
| 3,818,752 | 6/1974 | Lindeberg | 73/49.2 |
| 3,872,712 | 3/1975 | Westervelt et al. | 73/40 |
| 3,893,332 | 7/1975 | Dolan et al. | 73/40 |
| 4,320,653 | 3/1982 | Bernhardt | 73/40 |
| 4,523,452 | 6/1985 | Brayman | 73/40 |
| 4,532,795 | 8/1985 | Brayman et al. | 73/40 |
| 4,625,545 | 12/1986 | Holm et al. | 73/40 |
| 4,715,214 | 12/1987 | Tveter et al. | 73/49.2 |
| 4,776,206 | 10/1988 | Armstrong et al. | 73/40 |
| 4,811,252 | 3/1989 | Furuse | 364/556 |
| 5,065,350 | 11/1991 | Fedder | 364/571.03 |

*Primary Examiner*—Hezron E. Williams
*Assistant Examiner*—Michael J. Brock
*Attorney, Agent, or Firm*—Biebel & French

[57] ABSTRACT

A leakage test apparatus and method whereby a test part may be tested for leaks using either a dynamic flow method or a pressure decay method. The apparatus includes an air supply and first, second and third conduits arranged in parallel with each other and extending from a first manifold pipe connected to the air supply to a second manifold pipe connected to the test part. The first conduit is adapted to fill the part with air from the air supply at a high flow rate, the second conduit includes a flow restriction orifice and is adapted to fill the part at an intermediate flow rate less than the high flow rate of the first conduit and the third conduit includes a flow meter adapted to measure flow from the first manifold pipe to the second manifold pipe during flow through the first conduit in a fill mode of operation and is further adapted to measure flow from the first to the second manifold pipe during flow through the second conduit in a stabilize mode of operation. In addition, a test mode of operation is provided during which leaks within the test part may be detected. Each of the stabilize and test modes of operation are initiated in response to the measured flow of a previous mode of operation approaching zero whereby the present test method operates on the basis of a flow rate measurement rather than on a time basis.

13 Claims, 2 Drawing Sheets

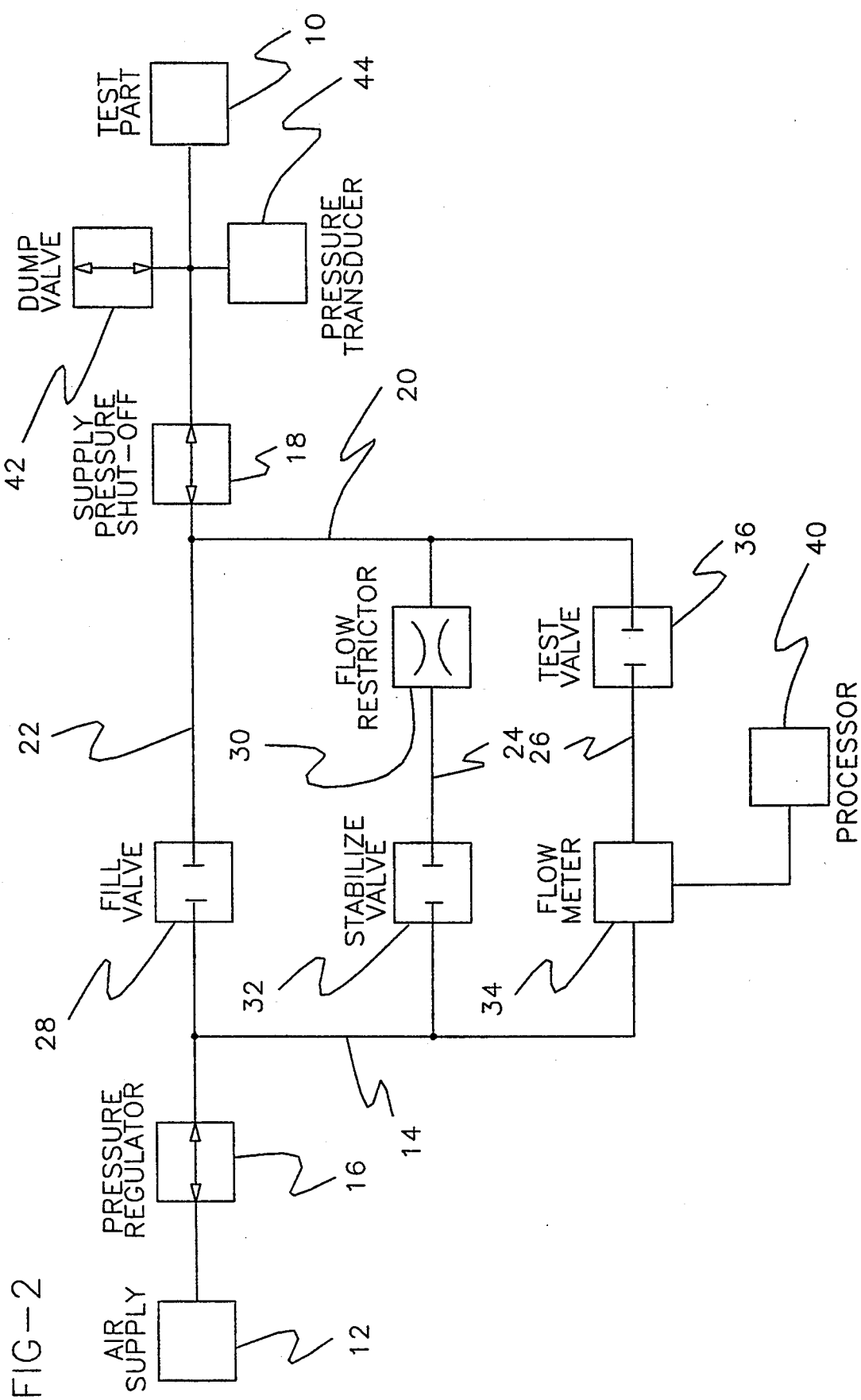

LEAK DETECTION SYSTEM

BACKGROUND OF THE INVENTION

1. Field of the Invention

The present invention relates to a leak detection system and, more particularly, to a pneumatic leak detection system for use in a manufacturing process to check parts and assemblies for leaks.

2. Description of Related Art

Pneumatic leak detection systems are commonly used in manufacturing processes to check parts and assemblies for leaks around joints, gaskets and welds, as well as for porosity in castings, and as an overall quality test. This requires that the test be conducted in the shortest time possible to reduce manufacturing time and cost.

Two pneumatic leak detection systems commonly used include the pressure decay leak test system and the dynamic or mass flow leak test system. Current pressure decay systems employ up to three different periods to test a part. These periods are usually referred to as fill, stabilize and test times, and each time period has a unique function. During the fill time period, the part is pressurized or charged by a pressure source to a value above the test pressure, and the pressure source is then removed or a valve is closed to initiate the stabilize time period.

As the part is pressurized during the fill period, the air undergoes adiabatic heating, and as the air then cools, the pressure within the part drops. The pressure within the part eventually stabilizes at some lower pressure, which is the test pressure if the test process is carried out correctly and there are no leaks. After the stabilization period, the part enters the test period where additional time is allowed for the pressure to drop, for example, if there is a leak or other defect in the part. At this time, a decision may be made as to whether to accept or reject the part.

In the mass flow leak test system, a pressure is maintained on the part from a pressure source throughout the test, and make-up air for compensating for any leaks while maintaining a predetermined pressure on the part is measured by a flow meter. If there is no leak, then no make-up air will be required. However, if there is a leak, then a certain mass flow of air will be required, which air is directed through the flow meter for accurately determining the magnitude of the leak. In this type of system, the stabilize period is normally eliminated and the fill and test phases overlap. In other words, as the pressurized air within the part cools after the initial fill, make-up air is provided and the flow to the part eventually stabilizes to either a no leak condition or to a steady state flow indicating the presence of a leak.

Typically, the termination of one of the test periods and the start of the next period is controlled in accordance with a preset time for each phase. For example, the time period for each phase may be set by using the test system to test a part which is known to have no defects whereby the required time for filling the part, for stabilizing the pressure in the part and for obtaining a test result may be determined. The actual times required for filling, stabilizing and testing the part are subject to variations in the ambient conditions of the environment surrounding the part, such as temperature and part variations, and as such can vary from day to day. Thus, the time periods for the different phases for testing the part may actually be too long or too short depending on variations in the conditions under which the part is tested.

Accordingly, there is a need for a leakage test apparatus and method which is capable of testing a part in the least amount of time necessary. In addition, there is a need for such an apparatus and method wherein the different phases of the testing are not regulated by preset time periods and wherein the start of each successive phase of the testing procedure occurs in response to a measured condition occurring during a prior phase of the testing procedure.

SUMMARY OF THE INVENTION

The present invention is intended to optimize the time required for the different phases of a test procedure by sensing the flow level into a part or assembly to be tested on an increasing sensitivity basis. As a result, the exact time when each phase of the procedure is concluding, based on the sensed flow rate or flow rate related parameter such as volume or derivative, may be determined such that the next phase of the procedure may be initiated. In the use of the present invention, the flow rate into the part to be tested changes by several orders of magnitude during the test process and increasing measurement sensitivity is provided to accurately track the flow into the part.

In ode aspect of the invention, a leakage test apparatus is provided comprising first means for filling a part to be tested for leakage at a first range of flow rates, second range of means for filling the part at a second range of flow rates wherein a maximum flow rate of the second range of flow rates is less than a maximum flow rate of the first range of flow rates, and third means for measuring flow to the part during flow through the first and second means. The first, second and third means preferably comprise separate first, second and third conduits, respectively. Each conduit has opposing first and second ends attached to first and second manifold pipes, respectively. The first manifold pipe is connected to a source of fluid pressure such as an air supply, and the second manifold pipe is connected to a part to be tested.

The second means defined by the second conduit includes a flow restrictor, such as an orifice, to restrict flow through the second conduit between the first and second manifold pipes, and the third means defined by the third conduit includes a flow meter for monitoring flow between the first and second manifold pipes during flow through the third conduit as well as during flow through the first and second conduits.

In a further aspect of the invention, a method of testing a part for leaks is provided comprising: filling the part at a first range of flow rates through a first flow path during a fill mode of operation, filling the part at a second range of flow rates through a second flow path during a stabilize mode of operation, monitoring the flow rate during the fill mode of operation to determine when the flow rate approaches zero or other flow related value, and initiating the stabilize mode of operation in response to the flow rate approaching zero during the fill mode of operation. Subsequently, the flow rate between the first and second manifold pipes is monitored during flow through the second flow path in the stabilize mode of operation to determine when the flow rate approaches zero, at which time a test mode of operation is initiated. The test mode of operation may comprise either a flow measurement during which flow is directed through a third flow path including a flow meter, or alternatively, the test mode of operation may comprise closing a valve to retain the pressure within the part to be tested and monitoring the pressure with a pressure transducer.

Therefore, it is a primary object of the present invention to provide a test apparatus and method whereby a leak testing procedure may be carried out on a process dependent, rather than time dependent, basis.

It is a further object of the invention to provide such a test apparatus and method wherein leaks in parts may be detected by either a mass flow measurement or a pressure decay measurement.

Other objects and advantages of the invention will be apparent from the following description, the accompanying drawings, and the appended claims.

BRIEF DESCRIPTION OF THE DRAWINGS

FIG. 2 is a diagrammatic view of a second embodiment of the present invention for measuring leakage in a test part using a pressure decay leak test.

DETAILED DESCRIPTION OF THE PREFERRED EMBODIMENT

Figure 1:
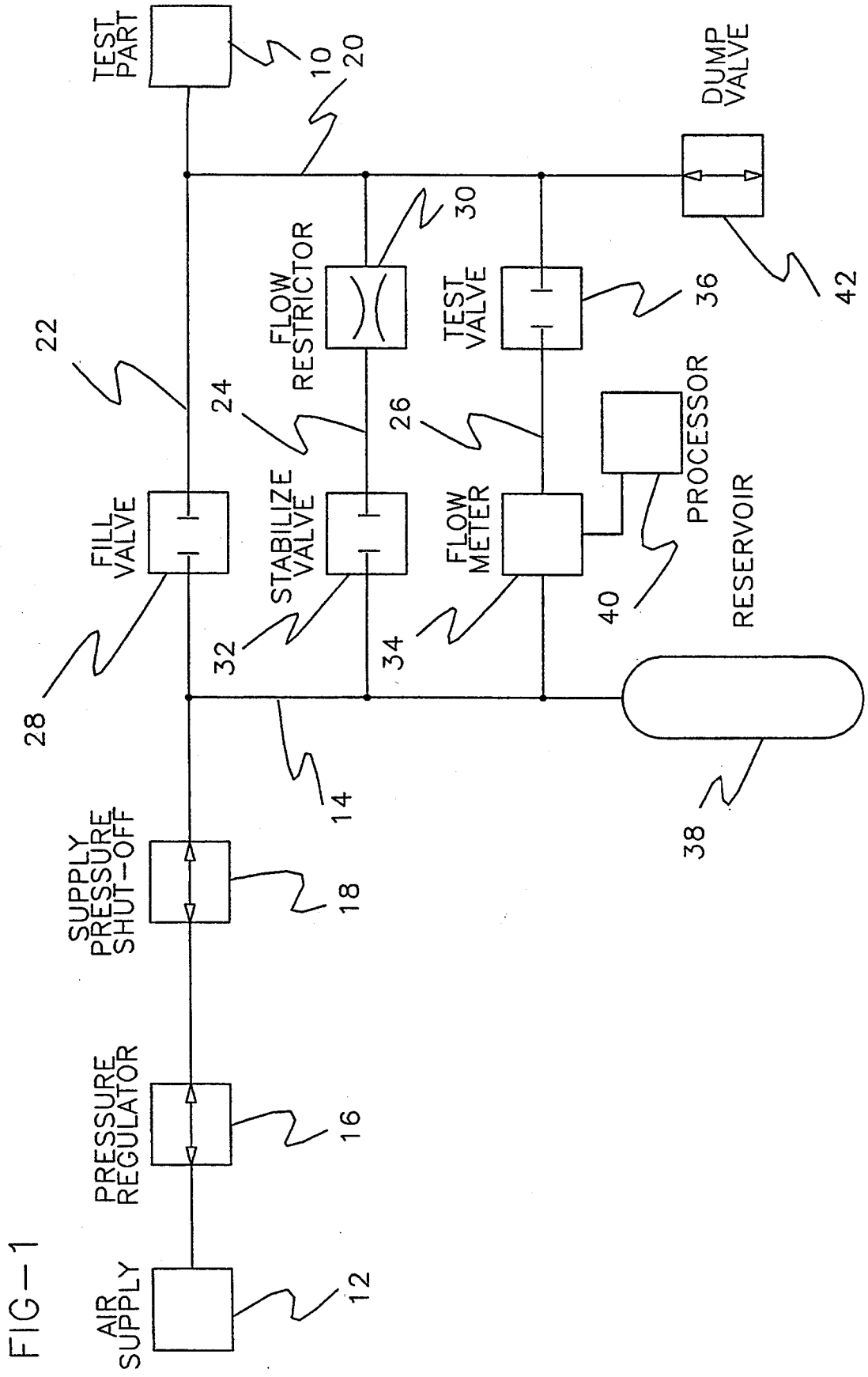
FIG. 1 is a diagrammatic view of a first embodiment of the present invention for detecting leakage in a test part using a mass flow leak test.

Referring initially to FIG. 1, a test apparatus of the present invention is shown for detecting leaks in a test part 10. It should be understood that the test part 10 may comprise individual parts or assemblies of parts which may require testing for leaks around joints, gaskets and welds, as well as for porosity in castings, or as an overall quality test.

The test apparatus comprises a system including a fluid source such as an air supply 12 for supplying air to a first manifold pipe 14 at a predetermined pressure controlled by a pressure regulator 16. In addition, a supply pressure shut-off valve 18 is provided for controlling the flow of air from the air supply 12 to the first manifold pipe 14.

The test part 10 is connected to a second manifold pipe 20 and a plurality of parallel flow paths defined by a first conduit 22, a second conduit 24 and a third conduit 26 extend from the first manifold pipe 14 to the second manifold pipe 20. The first conduit 22 comprises an essentially unrestricted flow path from the first manifold pipe 14 to the second manifold pipe 20, and includes a fill valve 28 for controlling flow through the first conduit 22.

The second conduit 24 includes a flow restrictor 30, such as a flow restricting orifice, such that the maximum flow rate through the second conduit 24 is less than the maximum flow rate through the first conduit 22. In addition, the second conduit 24 includes a stabilize valve 32 for controlling flow through the second conduit 24.

The third conduit 26 includes a flow meter 34 for measuring flow from the first manifold pipe 14 to the second manifold pipe 20 during flow through the first, second and third conduits 22, 24 and 26, as will be described further below. The third conduit 26 also includes a test valve 36 for controlling flow through the third conduit 26. It should be noted that reference to the flow meter 34 in the present invention is intended to encompass any related measurement device, such as devices for measuring differential pressure across an orifice, or for measuring actual pressure.

A reservoir 38 is also provided connected to the first manifold pipe 14 for storing pressurized air at a desired test pressure. The reservoir 38 preferably has a much larger volume than the volume of the test part 10 such that the reservoir 38 is capable of providing a flow of air to the test part 10 during a test procedure without causing the pressure within the reservoir 38 to drop significantly.

In addition, a processor 40 is preferably provided for controlling the test procedure, and although the processor 40 is shown connected only to the flow meter 34, it should be understood that the present invention also contemplates using the processor to control each of the valves associated with the test system and that the control of the various valves is conducted in response to measurements made by the flow meter 34, as will be described further below.

The system shown in FIG. 1 is used for a dynamic or mass flow leak detecting procedure. The steps of the procedure for testing a part 10 for leakage includes connecting the part 10 to be tested to the second manifold pipe 20 and closing a dump valve 42 on the second manifold pipe 20. The air supply 12 may be connected to the system at this time, if it is not already connected, and the fill valve 28, stabilize valve 32 and test valve 36 are closed. The supply pressure shut-off valve 18 is then opened to fill the reservoir 38 to the desired test pressure. At this point, the system is ready to perform the sequence of operations required to test the part 10 for leaks.

Initially, the test valve 36 and fill valve 28 are opened to provide a high flow rate of air to the test part 10 during a fill mode of operation. During this mode of operation, the flow meter 34 monitors the flow of air from the first manifold pipe 14 to the second manifold pipe 20 inasmuch as part of the air flow is diverted through the third conduit 26 and flow meter 34. As the pressure in the test part 10 increases, less flow is diverted through the flow meter 34 and the sensed flow approaches a predetermined value such as zero. At this point, the supply pressure shut-off valve 18 and fill valve 28 are closed and the stabilize valve 32 is opened to permit air flow from the reservoir 38 through the second conduit 24 as the air within the test part 10 cools. As noted above, during an initial fill operation, the air supplied for filling the test part 10 will become heated as a result of adiabatic heating which occurs during the increase in air pressure within the test part 10.

It should be noted that although the shut-off valve 18 is described in the present embodiment as being closed at the same time as the fill valve 28, it is contemplated that the shut-off valve 18 may be closed at other times in the process as long as sufficient air is continuously supplied to the test part 10 at a constant regulated pressure.

During a stabilize mode of operation, air flows from the reservoir 38 through both the second conduit 24 and the third conduit 26 to the test part 10, and the maximum rate of flow through the second conduit 24 is limited by the flow restrictor 30 whereby the range of flow rates provided to the test part 10 during the stabilized mode is lower than the range of flow rates during the fill mode to ensure that the pressure is stabilized within the least possible time. As the air in the test part 10 continues to stabilize, the flow measured by the flow meter 34 approaches a predetermined value such as zero, at which time the stabilize valve 32 is closed such that all flow to the test part 10 is provided via the third conduit 26 and the flow meter 34 during a test mode of operation. The maximum flow through the third conduit 26 is much lower than the maximum flow through the second conduit 24 and flow will continue through the third conduit 26 until the pressure in the test part 10 is equal to the pressure within the reservoir 38, at which time the flow will stop completely for a part 10 which has no leaks.

If there is a leak in the test part 10, then the flow through the flow meter 34 will approach a value corresponding to the size of the leak such that the flow meter 34 provides a direct measurement of the leak rate of the test part 10. As noted above, this assumes that the volume of the reservoir 38 is much larger than the volume of the test part 10 such that the flow of air through a leak in the test part 10 will not significantly diminish the pressure within the reservoir 38.

Once it is determined that the test part is either acceptable or contains a leak, the test valve 36 is closed and the dump valve 42 is opened to relieve the pressure within the test part 10. In addition, the supply pressure shut-off valve 18 may also be opened at this time to recharge the reservoir 38 in preparation for testing of a subsequent part.

It should be noted that the processor 40 of the present system may be preprogrammed by taking the system through a test operation with a known good part. During programming of the system, an operator installs the known good part on the second manifold pipe 20 and places the processor 40 in a learn mode of operation. The processor 40 then may cycle through a test sequence of operations such as the ones described above and use a previously determined algorithm to determine the necessary switching levels for switching the system from the fill mode of operation to the stabilize mode of operation and from the stabilize mode of operation to the test mode of operation. Thus, by comparing a part 10 to be tested with the known values stored in the processor, it is possible to determine at an early stage in the test procedure whether a part has a leak or not. For example, while the flow is monitored during the test mode of operation, it may be noted that, although the pressure is not stabilized, the flow rate reading is below the reject level and hence acceptable, such that the test procedure may then be terminated prior to the final mode of stabilization. In this manner, a significant savings in time may be obtained by controlling the operation on the basis of the measured flow rate of air rather than on a time basis.

It should also be noted that the flow rate to the part 10 changes by several orders of magnitude from the fill mode of operation to the test mode of operation, and further that a progressively increasing sensitivity in the flow rate measurement is obtained by providing different ranges of flow rates to the part during the different phases of the test procedure. For example, in a typical test procedure for a part 10, the peak flow rate may be set for 10 liters per minute, the peak stabilize flow rate may be set for 1 liter per minute and the peak test flow rate may be set for 0.1 liter per minute. In such a set-up, the present invention is capable of monitoring reject levels at a flow rate of approximately 0.01 liter per minute during the test mode of operation.

Referring to FIG. 2, a second embodiment of the present invention is shown wherein a pressure decay version of the test apparatus is disclosed. Elements in this embodiment which correspond to elements in the first embodiment are labeled with the same reference numeral.

The present embodiment of the invention differs from the first embodiment in that this embodiment does not include the reservoir 38 connected to the first manifold pipe 14, and the supply pressure shut-off valve 18 has been moved to a location between the second manifold pipe 20 and the test part 10. In addition, the dump valve 42 is located between the pressure shut-off valve 18 and the test part 10 and a pressure transducer 44 is also provided at this location for sensing the pressure within the part 10. It should also be noted that the pressure transducer 44 is preferably connected to the processor 40 in the same manner as was discussed above with regard to the flow meter 34 and the valves for controlling the system.

The operation of the apparatus shown in FIG. 2 is essentially the same as that described for the first embodiment with regard to the fill mode of operation and the stabilize mode of operation. However, for the test mode of operation, the supply pressure shut-off valve 18 is closed and the pressure transducer 44 monitors the pressure within the test part 10 such that any pressure drop in the test part 10 due to a leak can be measured over a test time.

It should be noted that the second embodiment provides the same advantages as described above with regard to the first embodiment during the filling of the test part 10 in that an early determination as to whether or not a part is defective may be made during the stabilize mode of operation when flow is directed through the second and third conduits 24 and 26.

It should further be noted that with regard to both embodiments of the present invention, the test times required for testing a series of parts may vary with varying ambient conditions. However, by monitoring the flow rate during the fill and stabilize modes of operation, it is possible to minimize the time spent during each of these operations. For example, the stabilize mode of operation may be initiated immediately upon sensing that the flow rate approaches a predetermined value such as zero during the fill mode of operation and the test mode of operation may be initiated immediately upon sensing that the flow rate approaches a predetermined value such as zero during the stabilize mode of operation with the flow rate measurement for each successive mode of operation being increasingly more sensitive to better provide an early determination as to whether the part is defective or not.

While the method and forms of apparatus herein described constitute preferred embodiments of the invention, it is to be understood that the invention is not limited to these precise methods and forms of apparatus, and that changes may be made therein without departing from the scope of the invention, which is defined in the appended claims.

What is claimed is:

1. A leakage test apparatus comprising:
    first means for filling a part to be tested for leakage at a first range of flow rates,
    second means for filling said part at a second range of flow rates wherein a maximum flow rate of said second range of flow rates is less than a maximum flow rate of said first flow rates, and
    third means associated with said first and second means for sensing flow to said part and also for initiating said second means in response to said sensed flow when a flow rate of said first range of flow rates approaches a predetermined value.

2. The apparatus as in claim 1 wherein said first means comprises a first conduit and said second means comprises a second conduit including an orifice for restricting flow.

3. The apparatus as in claim 1 wherein said third means is operable to determine when a pressure within said part has stabilized while said second means is filling said part.

4. The apparatus as in claim 1 wherein said first means and said second means define separate parallel flow paths, each said flow path including a first end being connected to a first manifold pipe in fluid communication with a fluid supply source and a second end connected to a second manifold pipe in fluid communication with said part.

5. The apparatus as in claim 4 wherein said fluid supply source is a pressure regulated air supply, said apparatus further including a shut-off valve located between said air supply and said first manifold pipe, and a reservoir connected to said first manifold pipe for supplying an air flow to said part through said second means and said third means when said shut-off valve is closed.

6. The apparatus as in claim 4 including a shut-off valve located between said second manifold pipe and said part and a pressure transducer for measuring pressure within said part when said shut-off valve is closed.

7. A leakage test apparatus comprising:
first means for filling a part to be tested for leakage at a first range of flow rates,
second means for filling said part at a second range of flow rates wherein a maximum flow rate of said second range of flow rates is less than a maximum flow rate of said first range of flow rates, and
third means for measuring flow to said part during flow through said first and second means,
wherein said first means comprises a first conduit and said second means comprises a second conduit including an orifice for restricting flow,
wherein said first conduit includes a first valve and said second conduit includes a second valve, said third means operating to determine when a sensed flow approaches a predetermined flow rate with said first valve open and said second valve closed, and said third means further operates to determine when sensed flow approaches a predetermined flow rate with said first valve closed and said second valve open.

8. A leakage test apparatus comprising:
first means for filling a part to be tested for leakage at a first range of flow rates,
second means for filling said part at a second range of flow rates wherein a maximum flow rate of said second range of flow rates is less than a maximum flow rate of said first range of flow rates, and
third means for measuring flow to said part during flow through said first and second means,
wherein said first means and said second means define separate flow paths, each said flow path including a first end being connected to a first conduit and a second end connected to a second conduit in fluid communication with said part,
wherein said third means comprises a flow path parallel to said flow paths defined by said first means and said second means and includes a first end connected to said first conduit and a second end connected to said second conduit.

9. A method of testing a part for leaks comprising:
filling said part at a first range of flow rates through a first flow path during a fill mode of operation,
filling said part at a second range of flow rates through a second flow path during a stabilize mode of operation,
monitoring said flow rates during said fill mode of operation to determine when the flow rate through said first flow path approaches a predetermined flow rate, and
wherein said stabilize mode of operation is initiated in response to said flow rate through said first flow path approaching said predetermined flow rate during said fill mode of operation.

10. The method as in claim 9 including the step of monitoring a flow rate during said stabilize mode of operation to determine when the flow rate approaches zero and subsequently initiating a test mode of operation.

11. The method as in claim 10 wherein a fluid flows through said first flow path and a third flow path including a flow meter during said fill mode of operation and said fluid flows through said second and third flow paths during said stabilize mode of operation.

12. The method as in claim 11 wherein during said test mode of operation, said fluid flows through said third flow path and is prevented from flowing through said first and second flow paths.

13. The method as in claim 9 including providing a fluid source and at least one valve between said fluid source and said part, and closing said valve subsequent to said fill mode and prior to a test mode of operation whereby flow to said part from said fluid source is prevented.

* * * * *